United States Patent
Wang et al.

(10) Patent No.: US 9,762,131 B1
(45) Date of Patent: Sep. 12, 2017

(54) FLYBACK CONVERTER WITH NO NEED FOR THE AUXILIARY WINDING

(71) Applicant: INNO-TECH CO., LTD., Taipei (TW)

(72) Inventors: Chih-Liang Wang, Taipei (TW); Ching-Sheng Yu, Taipei (TW); Wen-Yen Pen, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 15/161,315

(22) Filed: May 23, 2016

(51) Int. Cl.
  *H02M 3/335* (2006.01)
  *H02M 1/08* (2006.01)
  *H02M 1/00* (2006.01)

(52) U.S. Cl.
  CPC ......... *H02M 3/33523* (2013.01); *H02M 1/08* (2013.01); *H02M 2001/0009* (2013.01)

(58) Field of Classification Search
  CPC .... H02M 1/08; H02M 3/335; H02M 3/33507; H02M 3/33523; H02M 3/33576; H02M 2001/293; H02M 2001/2932
  See application file for complete search history.

(56) References Cited

U.S. PATENT DOCUMENTS

| | | | | |
|---|---|---|---|---|
| 6,853,563 B1 * | 2/2005 | Yang | ................ | H02M 3/33507 363/21.15 |
| 7,619,909 B2 * | 11/2009 | Chang | ............... | H02M 3/33507 323/288 |
| 8,533,508 B2 * | 9/2013 | Chang | ................... | G06F 1/3218 323/221 |
| 2011/0012554 A1 * | 1/2011 | Lin | ....................... | H02J 7/0052 320/107 |
| 2017/0012539 A1 * | 1/2017 | Chen | ................. | H02M 3/33523 |

* cited by examiner

*Primary Examiner* — Matthew Nguyen
(74) *Attorney, Agent, or Firm* — Lin & Associates Intellectual Property, Inc.

(57) ABSTRACT

Disclosed is an Auxiliary-Free High-Side Driven Secondary-Side Regulated (AF-HSD-SSR) flyback converter, which includes an AC-to-DC rectification unit, an input capacitor, a switching unit, a current-sensing resistor, an Auxiliary-Free (AF) flyback transformer, an output rectifier, an output capacitor, a PWM controller, and a SSR unit. The AF flyback transformer includes a primary winding and a secondary winding, where the primary winding is split into two halves. The switching unit is placed at the high side of the primary winding, and the PWM controller in collocation with the SSR unit drives the switching unit in response to all the required voltage and current sense signals to keep voltage conversion and power delivery safe and efficient within the specifications. The first half of the primary winding can provide the PWM controller with a continuous and steady working voltage supply after startup, thus eliminating the need for the auxiliary winding.

6 Claims, 4 Drawing Sheets

US 9,762,131 B1

FLYBACK CONVERTER WITH NO NEED FOR THE AUXILIARY WINDING

BACKGROUND OF THE INVENTION

1. Field of the Invention

The present invention relates to a flyback converter, and more specifically to a flyback converter with no need for the auxiliary winding in the flyback transformer, leading to simplification of transformer structure and reduction in transformer cost.

2. The Prior Arts

Various DC-powered devices, such as integrated circuits, DC motors, or liquid crystal displays without a proper DC voltage source, would need a suitable voltage converter, such as a flyback converter, a forward converter, or an LLC converter for DC-to-DC voltage conversion, to convert a rectified AC voltage source to a specified DC voltage level to power them.

In prior arts, a flyback converter normally has its output voltage regulated either by Secondary-Side Regulation (SSR) or by Primary-Side Regulation (PSR). SSR regulates the output voltage by means of optical coupling from the secondary side, requiring an optocoupler-based feedback control circuit in the secondary side while having the advantage of a tighter output voltage regulation. PSR regulates the output voltage by means of magnetic coupling to the primary side, requiring no optocoupler-based feedback control circuit in the secondary side while having the disadvantage of a looser output voltage regulation.

Also, a traditional flyback converter generally has its primary switch driven by a Low-Side Drive (LSD), which drives a primary switch placed at the low side of a primary winding, requiring an auxiliary winding in the primary side because the primary winding can't fill in for the auxiliary winding to power the primary IC controller with a continuous and steady working voltage after startup.

For the purpose of eliminating the auxiliary winding from a flyback transformer, the present invention discloses a High-Side Drive (HSD), which drives a primary switch placed at the high side of a primary winding, requiring no auxiliary winding in the primary side because the primary winding can fill in for the auxiliary winding to power the primary IC controller with a continuous and steady working voltage after startup.

Please take a look at FIG. 1 illustrating a traditional LSD-SSR flyback converter with an auxiliary winding NA. The traditional LSD-SSR flyback converter comprises an LSD flyback converter placed across the primary and secondary side for voltage conversion and power delivery, an optocoupler 92-based feedback network placed in the secondary side for SSR, and a Pulse Width Modulation (PWM) controller 90 placed in the primary side for controlling and driving the LSD-SSR flyback converter. Further, the transformer 40, which comprises a primary winding NP, a secondary winding NS, and an auxiliary winding NA needing to be present for continuously and steadily powering the primary PWM controller 90 because the primary winding NP can't lend itself to continuously and steadily powering the primary PWM controller 90 in the absence of the auxiliary winding NA.

The PWM controller 90 starts switching the switch transistor 80 on and off when the unregulated input voltage source VIN charges the VCC capacitor 34 up to the startup level through the startup resistor 22 after power-on. The LSD-SSR flyback converter gets into its steady-state operation after the auxiliary winding NA takes over the continuous and steady working voltage supply by replenishing the VCC capacitor 34 with an induced voltage (≈VO/NS*NA) through the diode rectifier 14 as long as the working voltage stays above the Undervoltage Lockout (UVLO) level.

FIG. 1 shows an LSD (Low-Side Drive), where the switch transistor 80, which can be but won't be limited to a Metal-Oxide Semiconductor Field Effect Transistor (MOSFET)/a Bipolar Junction Transistor (BJT), in series with a current-sensing resistor 25 is placed at the low side of the primary winding NP and the IC GND is connected and referenced to the source/emitter through the current-sensing resistor 25 to drive the switch transistor 80 with source/emitter-referenced PWM signal.

FIG. 1 also shows a Secondary-Side Regulation (SSR), where the output voltage $V_O$ gets regulated by an optocoupler-based feedback loop through an optical coupling signal from the secondary side. It is worth mentioning that the diode rectifier 19 can be placed either at the secondary high side or at the secondary low side with no influence on the output voltage sense through the optocoupler-based feedback loop.

Now, please take another look at FIG. 2, which shows an LSD-PSR flyback converter. Identical/similar to that in FIG. 1, the LSD in FIG. 2 wouldn't be restated herein. Only PSR as well as continuous and steady working voltage supply, which rely heavily on the auxiliary winding NA, need to be detailed hereafter. With reference to the PWM controller in FIG. 2, the FB pin would be internally clamped at a slightly negative/positive potential (−0.3V/0.15V typical), protecting the FB pin against an excessively negative voltage, when the primary power BJT switches on to store energy and the auxiliary winding NA induces a negative voltage $$-\frac{N_A}{N_P}V_I.$$

The FB pin would sense a scaled-down reflected output voltage $$\frac{N_A}{N_S}V_O \times \frac{R_2}{R_1+R_2},$$

which is used to execute PSR, when the secondary power diode turns on to release energy and the auxiliary winding NA induces a positive voltage $$\frac{N_A}{N_S}V_O,$$

which is used to replenish the VCC capacitor. It's crystal clear that the auxiliary winding NA here wears two hats: PSR as well as continuous and steady working voltage supply.

Having their primary switch low-side driven, the traditional flyback converters, be they secondary-side regulated (FIG. 1) or primary-side regulated (FIG. 2), all need an auxiliary winding, which can be further left out using a High-Side Drive (HSD), as will be elaborated in the following paragraphs.

SUMMARY OF THE INVENTION

The primary objective of the present invention is to provide a HSD-SSR flyback converter with no need for the auxiliary winding, called hereafter Auxiliary-Free High-Side Driven Secondary-Side Regulated (AF-HSD-SSR) flyback converter for quick reference. The AF-HSD-SSR flyback converter comprises an AC-to-DC rectification unit, an input capacitor, a switching unit, a current-sensing resistor, an Auxiliary-Free (AF) flyback transformer, an output rectifier, an output capacitor, a PWM controller, and a SSR unit, where the switching unit, placed at the high side of the primary winding, is high-side driven by the PWM controller.

The primary winding is connected in series with the input capacitor, the switching unit, and the current-sensing resistor to form an energy-storing power loop in the primary side. The secondary winding is connected in series with the output rectifier and the output capacitor to form an energy-releasing power loop in the secondary side. The SSR unit is connected to the output terminal through a voltage divider and a current-limiting resistor as well as optocoupled to the COMP pin of the PWM controller to form a voltage-regulating signal loop for the output voltage.

The AC-to-DC rectification unit in collocation with the input capacitor forms a peak-rectifier for the AC mains, which peak-rectifies an universal AC input voltage source (90~264 Vac) into a unregulated DC input voltage source (127~373 Vdc) as the input voltage to the AF-HSD-SSR flyback converter. The AC-to-DC rectification unit, which is placed between the AC mains and the input capacitor, can be but won't be limited to a diode bridge rectifier or a MOSFET bridge rectifier.

The switching unit, connected in series with the current-sensing resistor, placed at the high side of the primary winding, and driven by the GATE pin of the PWM controller, can be but won't be limited to a power Metal Oxide Semiconductor Field Effect Transistor (MOSFET) or a power Bipolar Junction Transistor (BJT). The GND pin of the PWM controller must be connected/referenced to the source/emitter of the power MOSFET/BJT through the current-sensing resistor in order to high-side drive the switching unit with a source/emitter-referenced PWM signal.

The AF flyback transformer simply comprises a primary winding and a secondary winding, where the primary winding is split into two halves, which can be made symmetric/asymmetric, i.e. given equal/unequal turns number, and the secondary winding is sandwiched in between the first half and the second half of the primary winding to enhance the magnetic coupling and reduce the leakage inductance of the AF flyback transformer. The first half of the primary winding can lend itself to providing the PWM controller with a continuous and steady working voltage supply after startup in the absence of the auxiliary winding, thus eliminating the need for the auxiliary winding.

More specifically, the first half of the primary winding would get a negative slice of the input voltage through winding voltage division, $$-\frac{N_{P1}}{N_{P1}+N_{P2}}V_I,$$

which is blocked off by the VCC diode, when the switching unit switches on to store energy and would induce a positive reflected voltage in proportion to the output voltage, $$\frac{N_{P1}}{N_S}V_O,$$

which can be used to replenish the VCC capacitor, when the output rectifier turns on to release energy.

The output rectifier in collocation with the output capacitor forms a peak-rectifier for the AF flyback transformer, which peak-rectifies the alternating secondary winding voltage waveform into a regulated DC output voltage level as the output voltage from the AF-HSD-SSR flyback converter. The output rectifier, which can be placed either at the secondary high side or at the secondary low side, can be but won't be limited to a diode rectifier or a synchronous rectifier.

Last but not least, the PWM controller in collocation with the SSR unit is at the helm of the AF-HSD-SSR flyback converter and drives the switching unit in response to all the required voltage and current sense signals to keep voltage conversion and power delivery safe and efficient within the specifications. The PWM controller, which is placed at the high side of the primary winding to drive the switching unit with a source/emitter-referenced PWM signal, can be but won't be limited to a 6-pin IC or an 8-pin IC.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
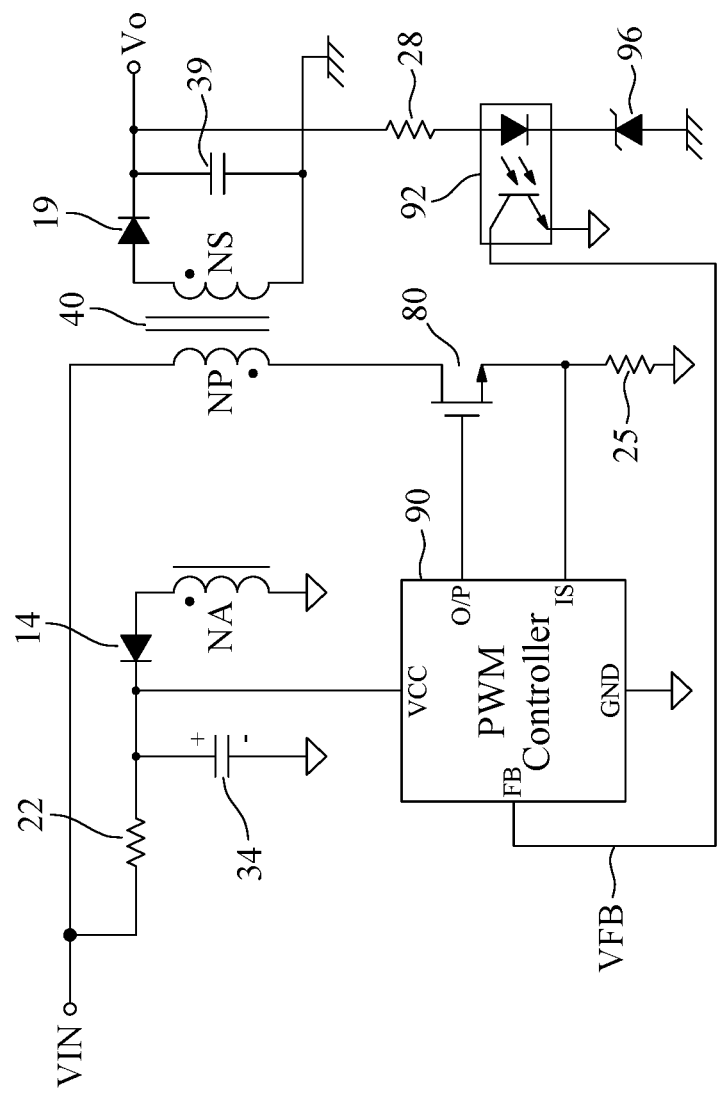
FIG. 1 shows a traditional LSD-SSR flyback converter built around a 5-pin PWM controller as an example.
Figure 2:
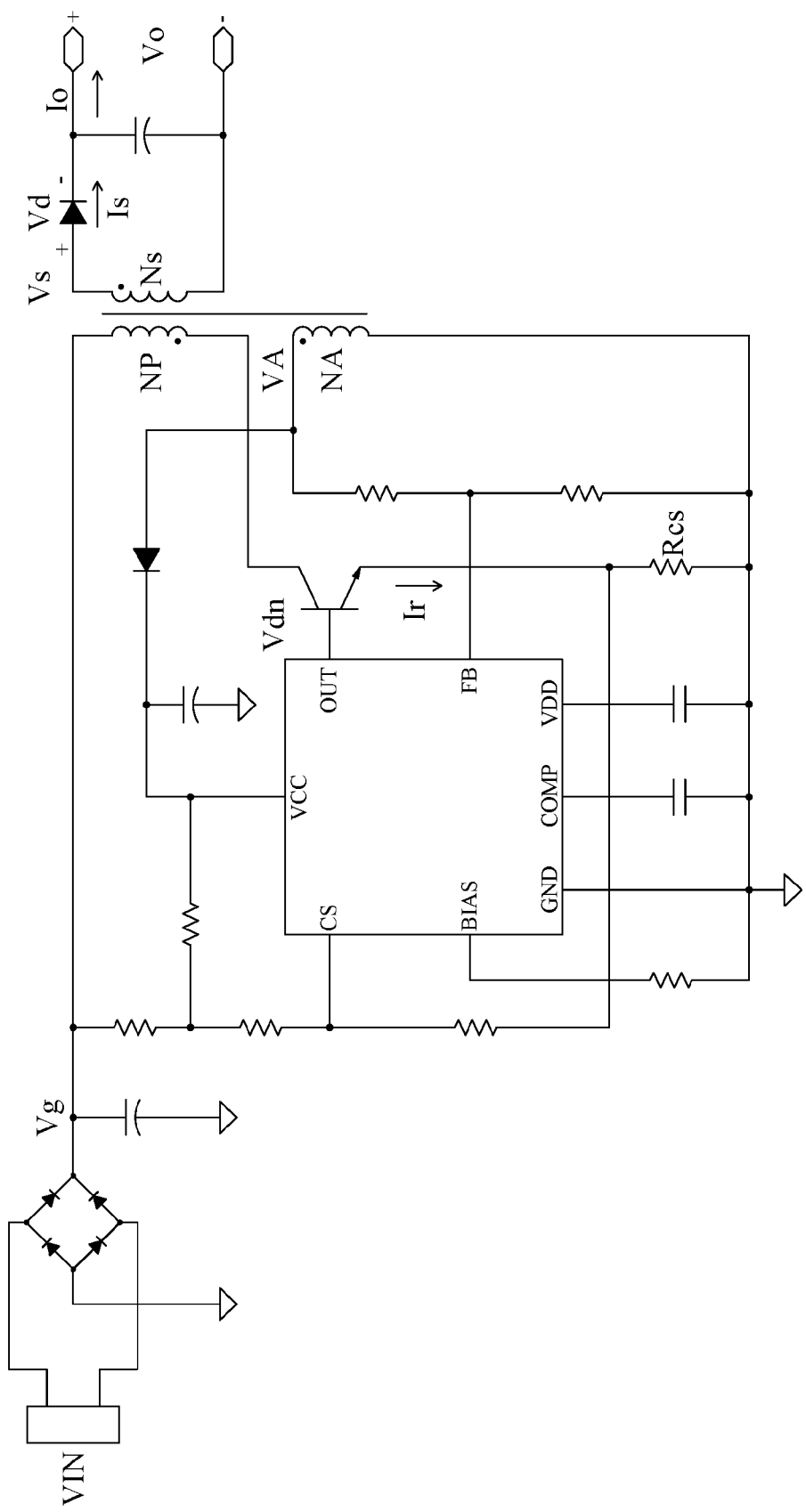
FIG. 2 shows a traditional LSD-PSR flyback converter built around an 8-pin PWM controller as an example.
Figure 3:
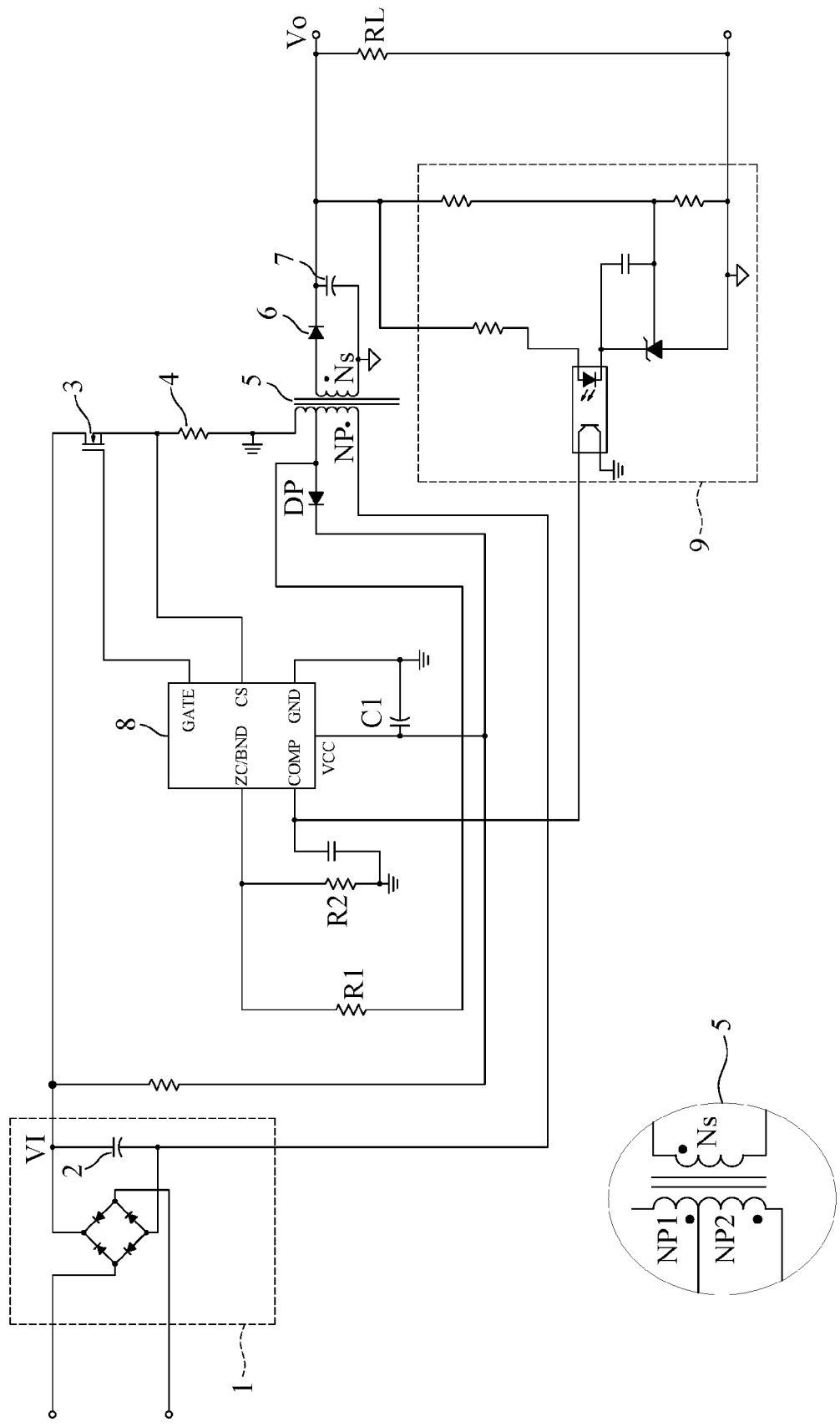
FIG. 3 shows a novel AF-HSD-SSR flyback converter built around a 6-pin PWM controller as an example according to the present invention.
Figure 4:
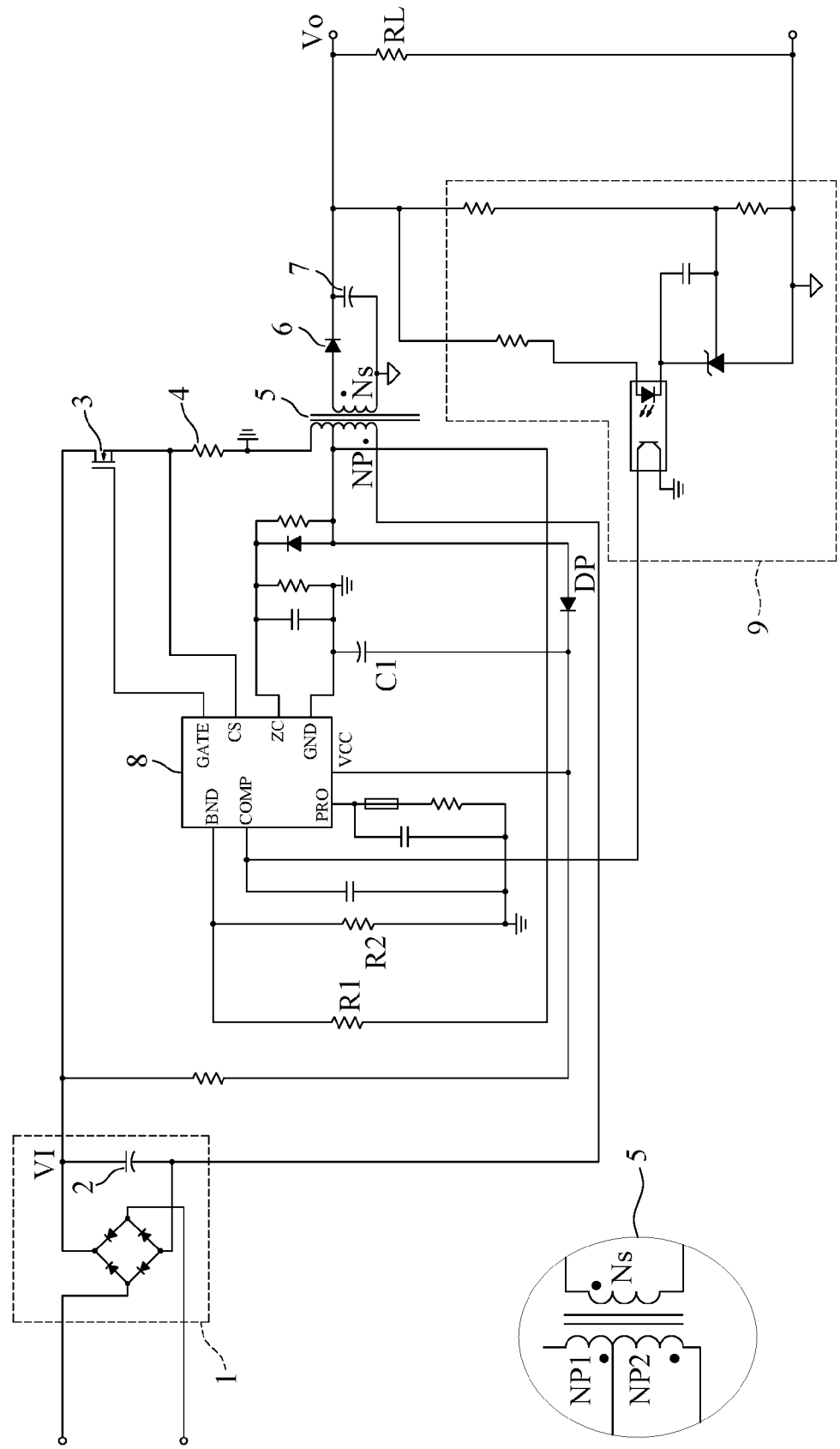
FIG. 4 shows a novel AF-HSD-SSR flyback converter built around an 8-pin PWM controller as an example according to the present invention.

Since FIG. 4 has a lot in common with FIG. 3 except the PWM controller, which is exemplified with a 6-pin IC (FIG. 3) or an 8-pin IC (FIG. 4), the following paragraphs would shed light only on FIG. 3 to give a clearer picture of the present invention.

Please refer to FIG. 3 for a novel AF-HSD-SSR flyback converter built around a 6-pin PWM controller as an example according to the present invention. The AF-HSD-SSR flyback converter comprises an AC-to-DC rectification unit 1, an input capacitor 2, a switching unit 3, a current-sensing resistor 4, an Auxiliary-Free (AF) flyback transformer 5, an output rectifier 6, an output capacitor 7, a PWM controller 8, and a SSR unit 9, where the switching unit 3, placed at the high side of the primary winding NP, is high-side driven by the PWM controller 8.

The primary winding NP is connected in series with the input capacitor 2, the switching unit 3, and the current-sensing resistor 4 to form an energy-storing power loop in the primary side. The secondary winding NS is connected in series with the output rectifier 6 and the output capacitor 7 to form an energy-releasing power loop in the secondary side. The SSR unit 9 is connected to the output terminal through a voltage divider and a current-limiting resistor as well as optocoupled to the COMP pin of the PWM controller 8 to form a voltage-regulating signal loop for the output voltage.

The AC-to-DC rectification unit 1 in collocation with the input capacitor 2 forms a peak-rectifier for the AC mains, which peak-rectifies an universal AC input voltage source (90~264 Vac typical) into a unregulated DC input voltage source (127~373 Vdc typical) as the input voltage to the AF-HSD-SSR flyback converter. It goes without saying that all the typical values are given for concretization of the inventive concept instead of limitation on the present invention. The AC-to-DC rectification unit 1, which is placed between the AC mains and the input capacitor 2, can be but won't be limited to a diode bridge rectifier or a MOSFET bridge rectifier.

The switching unit 3, connected in series with the current-sensing resistor 4, placed at the high side of the primary winding NP, and driven by the GATE pin of the PWM controller 8, can be but won't be limited to a power MOSFET or a power BJT. The GND pin of the PWM controller 8 must be connected/referenced to the source/emitter of the power MOSFET/BJT through the current-sensing resistor 4 in order to high-side drive the switching unit 3 with a source/emitter-referenced PWM signal.

The AF flyback transformer 5 simply comprises a primary winding NP and a secondary winding NS, where the primary winding NP is split into two halves NP1 and NP2, which can be made symmetric/asymmetric, i.e. given equal/unequal turns number, and the secondary winding NS is sandwiched in between the first half NP1 and the second half NP2 of the primary winding NP to enhance the magnetic coupling and reduce the leakage inductance of the AF flyback transformer 5. It cannot be emphasized enough that the AF flyback transformer 5, encompassed within the spirit and scope of the present invention, can have but won't be limited to having a sandwich winding structure. The first half NP1 of the primary winding NP can lend itself to providing the PWM controller 8 with a continuous and steady working voltage supply after startup in the absence of the auxiliary winding, thus eliminating the need for the auxiliary winding.

More specifically, the first half NP1 of the primary winding NP would get a negative slice of the input voltage VI through winding voltage division, $$-\frac{N_{P1}}{N_{P1}+N_{P2}}V_I,$$

which is blocked off by the VCC diode DP, when the switching unit 3 switches on to store energy and would induce a positive reflected voltage in proportion to the output voltage $V_O$, $$\frac{N_{P1}}{N_S}V_O,$$

which can be used to replenish the VCC capacitor C1, when the output rectifier 6 turns on to release energy.

The output rectifier 6 in collocation with the output capacitor 7 forms a peak-rectifier for the AF flyback transformer 5, which peak-rectifies the alternating secondary winding voltage waveform into a regulated DC output voltage level as the output voltage from the AF-HSD-SSR flyback converter. The output rectifier 6, which can be placed either at the secondary high side or at the secondary low side, can be but won't be limited to a diode rectifier or a synchronous rectifier.

Last but not least, the PWM controller 8 in collocation with the SSR unit 9 is at the helm of the AF-HSD-SSR flyback converter and drives the switching unit 3 in response to all the required voltage and current sense signals to keep voltage conversion and power delivery safe and efficient within the specifications. The PWM controller 8, which is placed at the high side of the primary winding NP to drive the switching unit 3 with a source/emitter-referenced PWM signal, can be but won't be limited to a 6-pin IC (FIG. 3) or an 8-pin IC (FIG. 4).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A flyback converter for converting an unregulated DC input voltage source into a regulated DC output voltage source, comprising an AC-to-DC rectification unit, an input capacitor, a switching unit, a current-sensing resistor, an Auxiliary-Free (AF) flyback transformer, an output rectifier, an output capacitor, a Pulse Width Modulation (PWM) controller, and a Secondary-Side Regulation (SSR) unit, Wherein the AF flyback transformer comprises a primary winding and a secondary winding, the switching unit is placed at a high side of the primary winding, and high-side driven by the PWM controller, the primary winding is split into a first half and a second half, the secondary winding is sandwiched in between the first half and the second half of the primary winding, the first half of the primary winding lends itself to providing the PWM controller with a continuous and steady working voltage supply after startup, the primary winding is connected in series with the input capacitor, the switching unit, and the current-sensing resistor to form an energy-storing power loop in a primary side, the secondary winding is connected in series with the output rectifier and the output capacitor to form an energy-releasing power loop in a secondary side, the PWM controller is placed at the high side of the primary winding as well as has at least four pins including a COMP pin, a GATE pin, a GND pin, and a CS pin, the SSR unit is connected to an output terminal through a voltage divider and a current-limiting resistor as well as optocoupled to the COMP pin of the PWM controller to form a voltage-regulating signal loop for an output voltage, the AC-to-DC rectification unit in collocation with the input capacitor forms a peak-rectifier for an AC mains and peak-rectifies a sinusoidal AC input voltage waveform into a unregulated DC input voltage source as an input voltage to the flyback converter, the AC-to-DC rectification unit is placed between the AC mains and the input capacitor, the switching unit is connected in series with the current-sensing resistor, placed at the high side of the primary winding, and driven by the GATE pin of the PWM controller, the GND pin of the PWM controller is connected to the source/emitter of the switching unit through the current-sensing resistor in order to high-side drive the switching unit with a source/emitter-referenced PWM signal, the output rectifier in collocation with the output capacitor forms a peak-rectifier for the AF flyback transformer, and peak-rectifies an alternating secondary winding voltage waveform into a regulated DC output voltage level as the output voltage from the flyback converter, the output rectifier is placed either at a secondary high side or at a secondary low side of the secondary winding, and the PWM controller in collocation with the SSR unit drives the switching unit in response to required voltage and current sense signals.

2. The flyback converter as claimed in claim 1, wherein the AC-to-DC rectification unit is a diode bridge rectifier or a Metal-Oxide Semiconductor Field Effect Transistor (MOSFET) bridge rectifier.

3. The flyback converter as claimed in claim 1, wherein the switching unit is a power MOSFET or a power Bipolar Junction Transistor (BJT).

4. The flyback converter as claimed in claim 1, wherein the first and second halves of the primary winding are made symmetric/asymmetric, or given equal/unequal turns number.

5. The flyback converter as claimed in claim 1, wherein the first half of the primary winding gets a negative slice of the input voltage through winding voltage division, $$-\frac{N_{P1}}{N_{P1}+N_{P2}}V_I,$$

which is blocked off by a VCC diode, when the switching unit switches on to store energy and induces a positive reflected voltage in proportion to the output voltage, $$\frac{N_{P1}}{N_S}V_O,$$

which is used to replenish a VCC capacitor when the output rectifier turns on to release energy, where $V_I$ stands for the input voltage and $V_O$ stands for the output voltage, $N_{P1}$ and $N_{P2}$ stand for numbers of turns of the first and second halves of the primary winding, and $N_s$ stands for number of turns of the secondary winding.

6. The flyback converter as claimed in claim 1, wherein the output rectifier is a diode rectifier or a synchronous rectifier.

* * * * *